(12) United States Patent
Shibuya (10) Patent No.: US 9,007,690 B2
(45) Date of Patent: Apr. 14, 2015

(54) LENS ARRAY

(75) Inventor: Kazutaka Shibuya, Kawaguchi (JP)

(73) Assignee: Enplas Corporation, Kawaguchi-Shi (JP)

( * ) Notice: Subject to any disclaimer, the term of this patent is extended or adjusted under 35 U.S.C. 154(b) by 0 days.

(21) Appl. No.: 14/002,953

(22) PCT Filed: Feb. 20, 2012

(86) PCT No.: PCT/JP2012/053914
§ 371 (c)(1),
(2), (4) Date: Sep. 3, 2013

(87) PCT Pub. No.: WO2012/124433
PCT Pub. Date: Sep. 20, 2012

(65) Prior Publication Data
US 2014/0002906 A1 Jan. 2, 2014

(30) Foreign Application Priority Data
Mar. 17, 2011 (JP) ................................ 2011-059516

(51) Int. Cl.
G02B 27/10 (2006.01)
B29C 33/42 (2006.01)
G02B 3/00 (2006.01)
B29L 11/00 (2006.01)

(52) U.S. Cl.
CPC .............. *G02B 3/005* (2013.01); *B29C 33/42* (2013.01); *B29L 2011/0016* (2013.01)

(58) Field of Classification Search
USPC .................................... 359/618–630; 264/1.1
See application file for complete search history.

(56) References Cited

U.S. PATENT DOCUMENTS

| 7,978,413 B2 * | 7/2011 | Abe et al. ....................... 359/628 |
| 2006/0285214 A1 * | 12/2006 | Haga et al. ..................... 359/619 |
| 2010/0244165 A1 | 9/2010 | Lake et al. |
| 2011/0063734 A1 * | 3/2011 | Sakaki .............................. 359/642 |
| 2012/0057100 A1 * | 3/2012 | Masuda et al. ................... 349/62 |
| 2013/0242401 A1 * | 9/2013 | Shibuya et al. ............... 359/627 |

FOREIGN PATENT DOCUMENTS

JP 2002-357701 A 12/2002
JP 2003-121615 A 4/2003

OTHER PUBLICATIONS

International Search Report (ISR) mailed Apr. 24, 2012, issued for International application No. PCT/JP2012/053914.

* cited by examiner

*Primary Examiner* — Mohammed Hasan
(74) *Attorney, Agent, or Firm* — Law Office of Katsuhiro Arai (57) ABSTRACT

A lens array is provided in which the edges of concave-shaped lens faces can be formed with high accuracy and the accuracy of position measurement of the lens faces can be improved. Outer peripheral edge portions 7a of a plurality of lens faces 7 are formed in positions further towards face apex portion sides than a predetermined surface 2 with cylindrical stepped surfaces 12 for each lens face 7 therebetween, one end of the stepped surfaces 12 being the outer peripheral edge portions 7a and another end being a plurality of opening portions 2a formed on the predetermined surface 2 such as to respectively face the outer peripheral edge portions 7a.

4 Claims, 7 Drawing Sheets

LENS ARRAY

This application is the U.S. National Phase under 35 U.S.C. §371 of International Application PCT/JP2012/053914, filed Feb. 20, 2012, which claims priority to Japanese Patent Application No. 2011-059516, filed Mar. 17, 2011. The International Application was published under PCT Article 21(2) in a language other than English.

TECHNICAL FIELD

The present invention relates to a lens array. In particular, the present invention relates to a lens array suitable for being manufactured using a mold.

BACKGROUND ART

In recent years, in reflection of the need for higher-speed communication and more compact communication devices, there has been an increasing demand for a lens array in which a plurality of lenses are arranged in parallel, as a compactly structured optical component effective for actualizing multichannel optical communication.

This type of lens array is capable of multichannel optical transmission achieved by a plurality of light-emitting elements (such as vertical cavity surface emitting lasers [VCSEL]) and a plurality of optical fibers being optically coupled, and multichannel optical reception achieved by a plurality of optical fibers and a plurality of light-receiving elements (such as photodetectors) being optically coupled. Furthermore, in addition to usage such as this, usefulness of the lens array is expected to further rise in the field of optical communication, such as through application to optical waveguides. In accompaniment, freedom of design of the lens array is expected to further widen.

Many of such lens arrays include convex-shaped lens faces. However, in some instances, concave-shaped lens faces are required depending on the light-beam shape to be formed, the light-beam diameter to be achieved, product dimensions, and the like (refer to, for example, Patent Literature 1).
Patent Literature 1: Japanese Patent Laid-open Publication No. 2003-121615

DISCLOSURE OF INVENTION

Problem to be Solved by the Invention

Because of its compact structure, this type of lens array is most often manufactured efficiently and at low cost by resin molding using a mold. Such trend is expected to continue.

In instances where a lens array including concave-shaped lens faces is manufactured using a mold, a following issue attributed to the concave shape of the lens faces has been pointed out.

In other words, in product inspection of the lens array, ordinarily, the positions of the lens faces are measured by visual confirmation of the edges (outer peripheral edge portions) of the lens faces based on a captured image of the lens faces. At this time, in the instance of a concave-shaped lens face molded using a mold, the edge may not be accurately confirmed. Here, confirmation of the edge is essential in performing position measurement of the lens face through calculation of a center point (coordinate) of the lens face based on a plurality of representative points (coordinates) on the edge. Therefore, if the edge cannot be accurately confirmed, not only does the measurement accuracy of the position of each lens face decline, variation in measurement accuracy occurs among the lens faces, resulting in a significant reduction in the advantages of using a mold, which is an efficient way to manufacture the lens array.

The reason the edge of the concave-shaped lens face cannot be accurately confirmed in this way is because machining accuracy of the mold for molding the concave-shaped lens face is poor, and molding of the edge itself cannot be performed with high accuracy.

Figure 10:
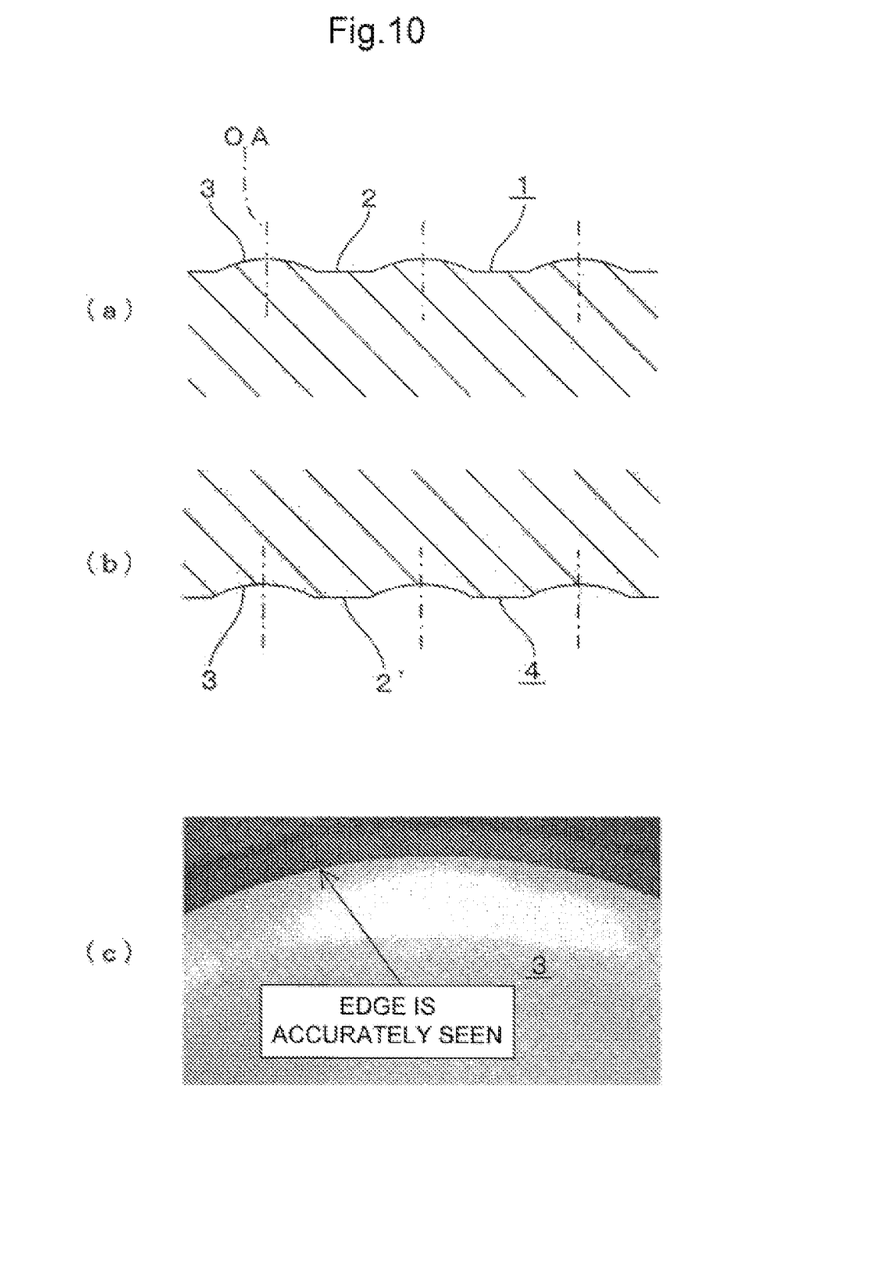

This will be described in comparison with a convex-shaped lens face. First, as shown in (a) in FIG. 10, to mold, as a lens array 1, a lens array in which a plurality of convex-shaped lens faces 3 are formed in an array on a predetermined surface 2 of the lens array, as shown in (b) in FIG. 10, a mold 4 is used that includes a concave-shaped transfer surface 3' adhering to (inverting) the face shape of each lens face 3 and a transfer surface 2' of the surface 2. In the mold 4 such as this, when machining is performed using a cutter (blade; cutting tool) by a mold machining machine, the boundary line between the transfer surface 3' of the lens face 3 and the transfer surface 2' of the surface 2 can be machined with high accuracy by the cutter because the transfer surface 3' of the lens face 3 has a concave shape. The boundary line appears as the edge of the lens face 3 in the molded product. (c) in FIG. 10 is a photographic image of an imaging result of the lens face 3 captured by a charge-coupled device (CCD) camera or the like during position measurement of the convex-shaped lens face 3 such as this. As shown in (c) in FIG. 10, the edge of the convex-shaped lens face 3 is clear and can be accurately confirmed.

Figure 11:
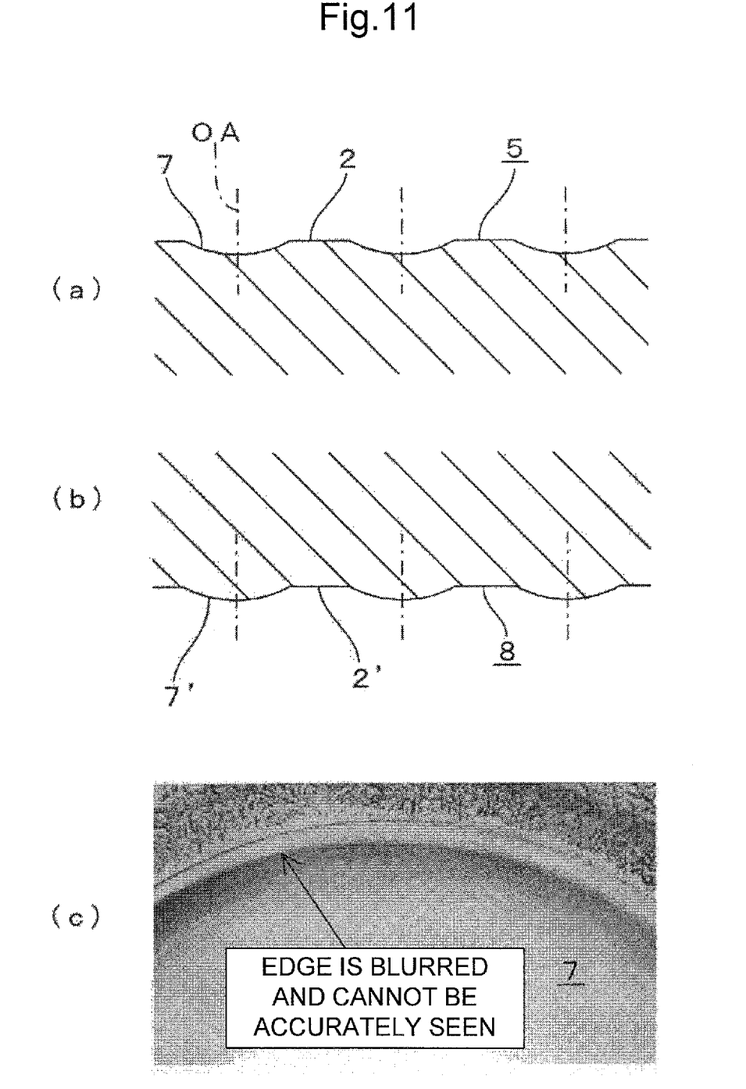
FIG. 11 This is an explanatory diagram for explaining an issue of a conventional lens array including concave-shaped lens faces.

On the other hand, as shown in (a) in FIG. 11, to mold, as a lens array 5, a lens array in which a plurality of concave-shaped lens faces 7 are formed in an array on a predetermined surface 2 of the lens array, as shown in (b) in FIG. 11, a mold 8 is used that includes a convex-shaped transfer surface 7' adhering to the face shape of each lens face 7 and a transfer surface 2' of the surface 2. In the mold 8 such as this, during machining, the convex shape of the transfer surface 7' of the lens face 7 interferes and the boundary portion between the transfer surface 7' of the lens face 7 and the transfer surface 2' of the surface 2 cannot be machined with high accuracy. A rounded (R) shape reflecting the shape of the tip of the cutter is formed. (c) in FIG. 11 is a photographic image of an imaging result of the lens face 7 during position measurement of the concave-shaped lens face 7 such as this. As shown in (c) in FIG. 11, the edge of the concave-shaped lens face 7 is blurred and accurate visual confirmation is difficult.

Therefore, the present invention has been achieved in light of the above-described issues. An object of the present invention is to provide a lens array in which the edges of concave-shaped lens faces can be formed with high accuracy, and the accuracy of position measurement of the lens faces can be improved.

Means for Solving Problem

To achieve the above-described object, a lens array according to a first aspect of the present invention is a lens array formed using a mold, the lens array including a plurality of lens faces formed in an array along a predetermined array direction on a predetermined surface of a lens array main body, in which the plurality of lens faces are concave-shaped lens faces that recess inward from the predetermined surface such that face apex portions are farther away from the predetermined surface than outer peripheral edge portions. In the lens array, the outer peripheral edge portions of the plurality of lens faces are formed in positions further toward the face apex portion side than the predetermined surface with cylindrical stepped surfaces for each lens face therebetween, the stepped surfaces of which one end is the outer peripheral edge portions and another end is a plurality of opening portions formed on the predetermined surface such as to respectively face the outer peripheral edge portions.

In the invention according to the first aspect, because the outer peripheral edge portion of the concave-shaped lens face is positioned further towards the face apex side than the predetermined surface with the stepped surface therebetween, during mold machining, a transfer portion of the outer peripheral edge portion can be machined with high accuracy using a cutter in a state in which the transfer portion projects further outward than a transfer surface of the predetermined surface. Therefore, the outer peripheral edge portion can be molded with high accuracy. As a result, during position measurement of the lens face, because the outer peripheral edge portion can be accurately confirmed, position measurement can be performed with high accuracy.

In addition, a lens array according to a second aspect is the lens array according to the first aspect in which, further, the outer peripheral edge portions of the plurality of lens faces are formed in positions shifted toward the face apex portion side from the predetermined surface by a same distance as one another.

In the invention according to the second aspect, the amount of shift from the predetermined surface of the outer peripheral edge portion of the lens face can be made uniform among the lens faces. Therefore, position measurement of the lens faces can be efficiently performed.

Furthermore, a lens array according to a third aspect is the lens array according to the first or second aspect in which, further, a rounded shape reflecting the shape of a tip end portion of a cutter used for machining the mold is formed in the opening portion of the stepped surface for each lens face.

In the invention according to the third aspect, a rounded shape that is difficult to avoid in mold machining can be used as a means for preventing mix-up with the opening portion during confirmation of the outer peripheral edge portion. Therefore, position measurement of the lens face can be more efficiently performed.

Effect of the Invention

In the present invention, the edges of concave-shaped lens faces can be formed with high accuracy, and measurement accuracy of the positions of the lens faces can be improved.

BRIEF DESCRIPTION OF DRAWINGS

FIG. 1 (*a*) is an overall configuration diagram of a lens array according to an embodiment of the present invention, and (*b*) is an overall configuration diagram of a mold of the lens array according to the embodiment of the present invention corresponding to (*a*).

FIG. 10 (*a*) is an overall configuration diagram of a lens array including convex-shaped lens faces, (*b*) is an overall configuration diagram of a mold corresponding to (*a*), and (*c*) is a captured image of the lens face in (*a*).

EXPLANATIONS OF LETTERS OR NUMERALS 2 surface
2*a* opening portion
7 lens face
7*a* outer peripheral edge portion
11 lens array
12 stepped surface

BEST MODE(S) FOR CARRYING OUT THE INVENTION

An embodiment of a lens array of the present invention will hereinafter be described with reference to FIG. 1 to FIG. 9.

Sections of which the basic configuration is the same or similar to that in the past are described using the same reference numbers.

The lens array according to the present embodiment is manufactured by a manufacturing method that uses a mold, such as an injection molding method using a resin material. As the resin material, polyetherimide, cyclic olefin resin, or the like can be selected as appropriate.

Figure 1:
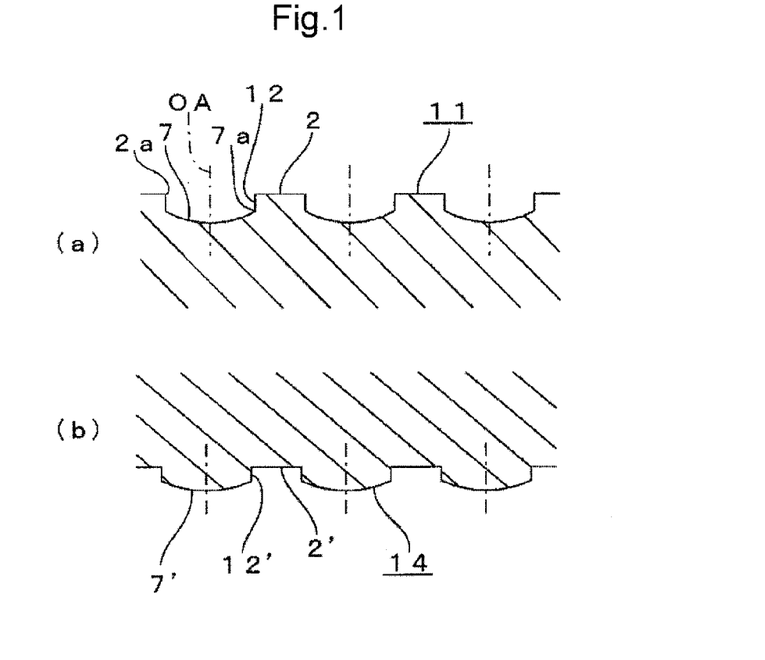

As shown in (*a*) in FIG. 1, a lens array 11 according to the present embodiment include a plurality of lens faces 7, each having a circular planar shape and the same dimensions, formed in an array along a predetermined array direction (lateral direction in (*a*) in FIG. 1) on a surface 2 serving as a predetermined surface of the lens array 11 (lens array main body). In a manner similar to that of a conventional lens array shown in (*a*) in FIG. 11, each lens face 7 is a concave-shaped lens face (concave lens face) that recesses in a surface normal direction (in other words, an optical axis OA direction) from the surface 2, such that a face apex portion (intersection between the lens face 7 and the optical axis OA) is farther away from the surface 2 than an outer peripheral edge portion 7*a* (edge).

However, unlike that of the conventional lens array, in the lens faces 7 according to the present embodiment, the outer peripheral edge portion 7*a* of each lens face 7 is formed in a position further towards the face apex portion side than the surface 2. More specifically, as shown in (*a*) in FIG. 1, a cylindrical stepped surface 12 having a predetermined thickness in the optical axis OA direction is interposed between the lens face 7 and the surface 2 for each lens face 7. Each stepped surface 12 has the outer peripheral edge portion 7*a* of the lens face 7 as one end and a circular opening portion 2*a*, of which a plurality are formed on the surface 2 such as to respectively face the outer peripheral edge portions 7*a*, as the other end. In this way, the outer peripheral portion 7*a* of each lens face 7 is positioned further towards the face apex portion side than the surface 2 with the stepped surface 12 therebetween.

To mold the lens array 11 such as this, as shown in (*b*) in FIG. 1, a mold 14 is used that includes a transfer surface 12' of the stepped surface 12, in addition to a convex-shaped transfer surface 7' adhering to (inverting) the face shape of each lens face 7 and a transfer surface 2' of the surface 2. In the mold 14 such as this, during machining using a cutter by a mold machining machine, although the transfer surface 7' of the lens face 7 has a convex shape as in a conventional mold 8 shown in (*b*) in FIG. 11, the boundary portion between the end portion of the transfer surface 7' and the transfer surface 2' of the surface 2 is not on the same plane as the transfer surface 2' of the surface 2 as was in the past. Rather, the boundary portion is positioned projecting further outward than the transfer surface 2' of the surface 2. Because the mold 14 such as this is structured similarly to that having a recessing portion between the transfer surfaces 7' of adjacent lens faces 7, a boundary line between the transfer surface 7' of the lens face 7 and the transfer surface 12' of the stepped surface 12, equivalent to an edge portion of the recessing portion, can be machined with high accuracy using the cutter in a manner similar to when the transfer surface 3' (recessing portion) of the convex-shaped lens face 3 shown in (*b*) in FIG. 10 is formed. To machine the mold 14 such as this, a mold machining machine is preferably used that is capable of machining the transfer surface 7' of the lens face 7, machining the transfer surface 2' of the surface 2, and machining the transfer surface 12' of the stepped surface 12 by simultaneous machining (same-step machining) by a single chuck. As a mold machining machine such as this, a lathe turning machine or a milling machine may be used.

In this way, according to the present embodiment, the boundary line between the transfer surface 7' of the lens face 7 and the transfer surface 12' of the stepped surface 12, or in other words, the transfer portion of the outer peripheral edge portion of the lens face 7 can be machined with high accuracy. Therefore, the outer peripheral edge portion 7a of the concave-shaped lens face 7 can be molded with high accuracy using the mold 14. As a result, because the outer peripheral edge portion 7a of the lens face 7 can be accurately confirmed during position measurement of the lens face 7, position measurement can be performed with high accuracy.

In addition to the above-described configuration, according to the present embodiment, the outer peripheral edge portion of each lens face 7 is formed in a position shifted toward the face apex portion side from the surface 2 by the same distance. In other words, the thickness of the stepped surface 12 of the lens face 7 is the same for each lens face 7.

In the configuration such as this, the amount of shift from the surface 2 of the outer peripheral edge portion 7a of the lens face 7 can be made uniform among the lens faces 7. Therefore, position measurement of the lens faces 7 can be efficiently performed.

Figure 2:
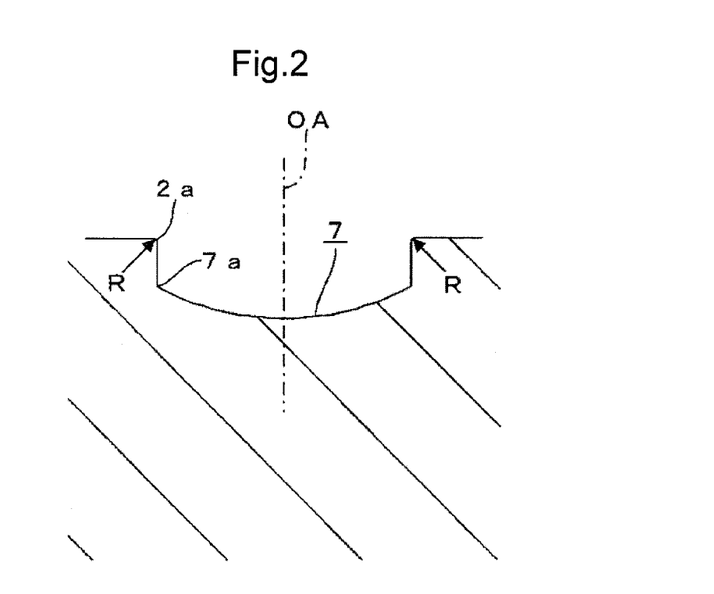
FIG. 2 This is an enlarged view of main sections of a variation example of the lens array according to the embodiment of the present invention.

In addition, in the opening portion 2a of the stepped surface 12 of each lens face 7, an R shape (reference number R in FIG. 2) may be formed that reflects the shape of the tip portion of the cutter used to machine the mold 14, as shown in FIG. 2. In a configuration such as this, a shape that is difficult to avoid in mold machining can be allowed as the shape of the molded product. In addition, compared to an instance in which the opening portion 2a is assumed to be formed into a sharp edge, mix-up between the opening portion 2a and the outer peripheral edge portion 7a of the lens face 7 can be prevented with certainty. Therefore, position measurement of the lens face 7 can be performed with further efficiency.

Furthermore, each lens face 7 may be a spherical surface or a non-spherical surface. The stepped surface 12 may be formed into a circular cylinder taking into consideration ease of design, or may be formed into a circular conical surface (tapered surface) in which the inner diameter gradually increases from the outer peripheral edge portion 7a side to the opening portion 2a side, taking into consideration releasability from the mold.

First Example

Figure 3:
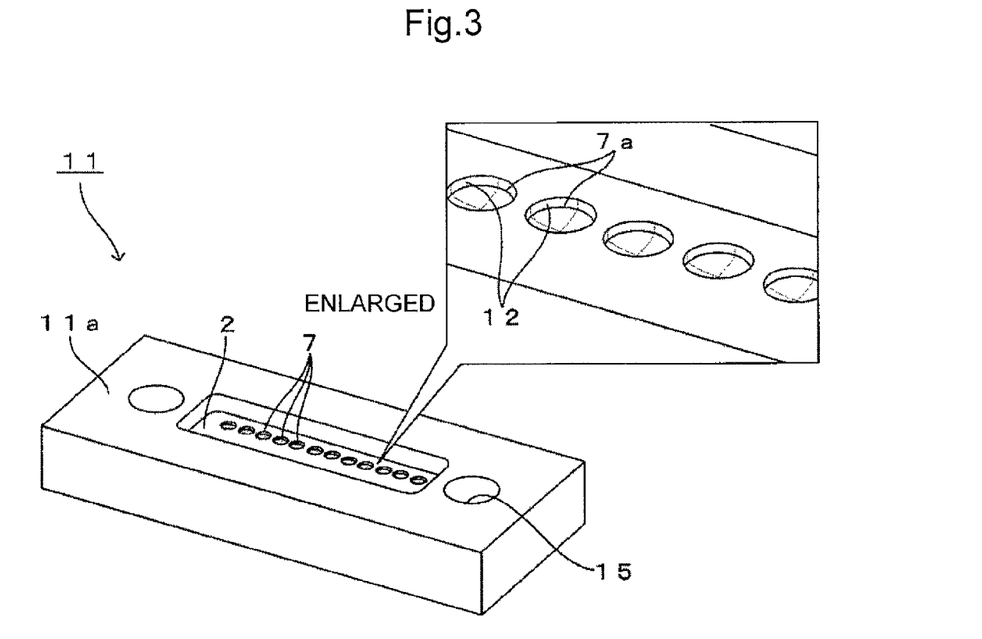
FIG. 3 This is an upper perspective view of a first example of the lens array of the present invention.
Figure 4:
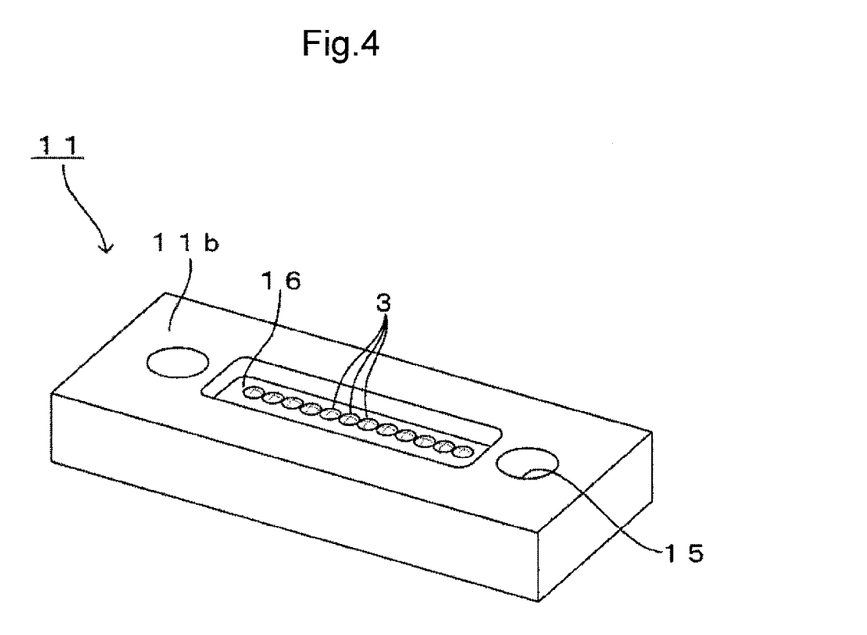
FIG. 4 This is a lower perspective view of FIG. 3.

Next, FIG. 3 is a perspective view of a first example of the lens array 11 according to the present embodiment. FIG. 4 is a perspective view in which the upper portion and the lower portion in FIG. 3 are inverted. As shown in FIG. 3, the overall shape of the lens array 11 of the present example is formed into a plate shape having a rectangular planar shape with a predetermined thickness in the up/down direction. The surface 2 on which the concave-shaped lens faces 7 are formed is formed on a recessing surface that recesses further inward than a top end surface 11a of the lens array 11 and is parallel with the top end surface 11a. In addition, a pair of circular through-holes 15 are formed on the surface 2 in positions on both outer sides in the array direction of the lens faces 7. The through-holes 15 are used for positioning a photovoltaic device (such as the VCSEL or photodetector) or an optical transmitter (such as an optical fiber or an optical waveguide) by pins provided on the photovoltaic device/optical transmitter side being inserted into the through-holes 15, when the photovoltaic device or optical transmitter is attached to the lens array 11.

On the other hand, as shown in FIG. 4, convex-shaped lens faces 3 are formed in an array, in correspondence with the concave-shaped lens faces 7, on a bottom end surface 11b of the lens array 11. The number of convex-shaped lens faces 3 is the same as the number of concave-shaped lens faces 7. The convex-shaped lens faces 3 are formed on a surface 16 that recesses further inward than the bottom end surface 11b of the lens array 11.

Figure 5:
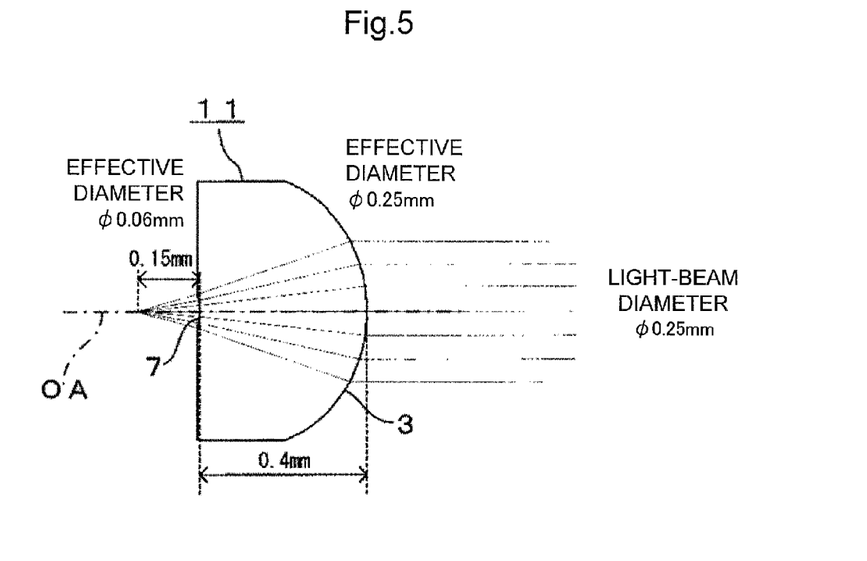
FIG. 5 This is a schematic diagram of an example of an optical path actualized by the lens array in FIG. 3.

For example, as shown in a schematic diagram in FIG. 5, with the concave-shaped lens faces (non-spherical) 7 as the incident side of light and the convex-shaped lens faces (non-spherical) 3 as the outgoing side of light, the lens array 11 of the present example such as this can be used to obtain collimated light having a diameter of $\Phi 0.25$ mm on the outgoing side. Specifically, the collimated light having a light-beam diameter such as this can be actualized by a position 0.15 mm from the concave-shaped lens face 7 on the optical axis OA being set as an outgoing position of light towards the lens face 7, an effective diameter of the concave-shaped lens face 7 being set to $\Phi 0.06$ mm, an effective diameter of the convex-shaped lens face 3 being set to $\Phi 0.25$ mm, and an optical path length of center light within the lens array 11 (lens center thickness) being set to 0.4 mm. A light-emitting point of the VCSEL, an end face of an optical fiber, or the like may be placed at the outgoing position of light. In addition, the collimated light may be received by, for example, an optical waveguide.

Figure 6:
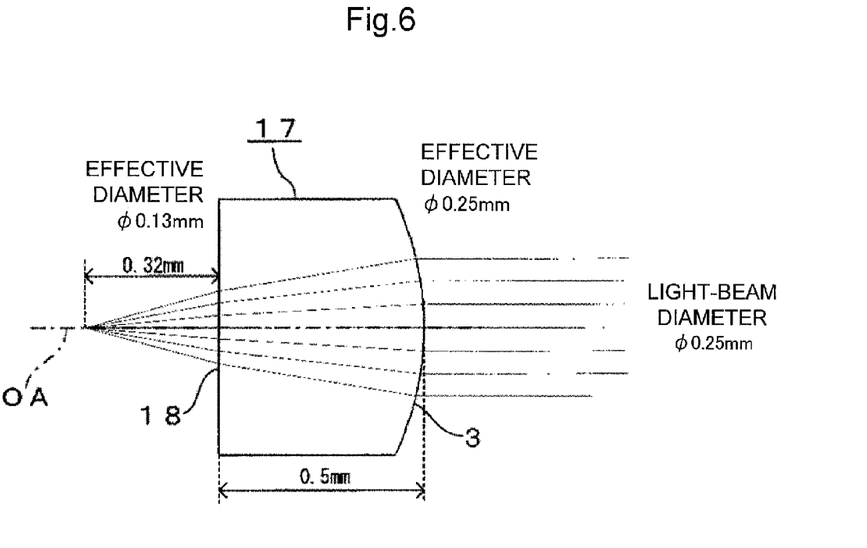
FIG. 6 This is a schematic diagram of a comparison example of the first example.

On the other hand, as shown in FIG. 6, in an instance in which collimated light having the same light-beam diameter as that of the lens array 11 in FIG. 5 is to be obtained by a plano-convex lens array 17, the outgoing position of light towards a plane lens face 18 is required to be set at a position 0.32 mm from the plane lens face 18 on the incident side on the optical axis, and the optical path length of center light within the lens array 17 is required to be set to 0.5 mm.

Therefore, use of the concave lens faces 7 is advantageous for shortening the optical path length in the device and reducing lens thickness when collimated light of a desired light-beam diameter is to be obtained.

Second Example

Figure 7:
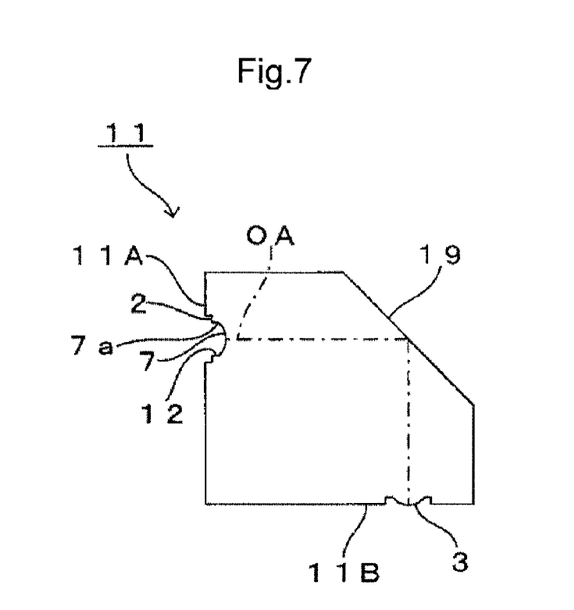
FIG. 7 This is a cross-sectional view of a second example of the lens array of the present invention.

Next, FIG. 7 is a cross-sectional view of a second example of the lens array 11 according to the present embodiment. As shown in FIG. 7, in the lens array 11 in the present example, the surface 2 on which the concave-shaped lens faces 7 are formed is formed as a recessing surface that recesses further inward than a front end face 11A of the lens array 11 and is parallel with the front end face 11A. In addition, a plurality of convex-shaped lens faces 3 similar to those in the first example are formed in an array on the bottom end face 11B of the lens array 11. In the present example, a total reflection surface 19 for forming an optical path connecting each concave-shaped lens face 7 and each convex-shaped lens face 3 is formed therebetween. The total reflection surface 19 forms a 45° angle in relation to both the optical axis OA of the concave-shaped lens face 7 and the optical axis OA of the convex-shaped lens face 3.

Figure 8:
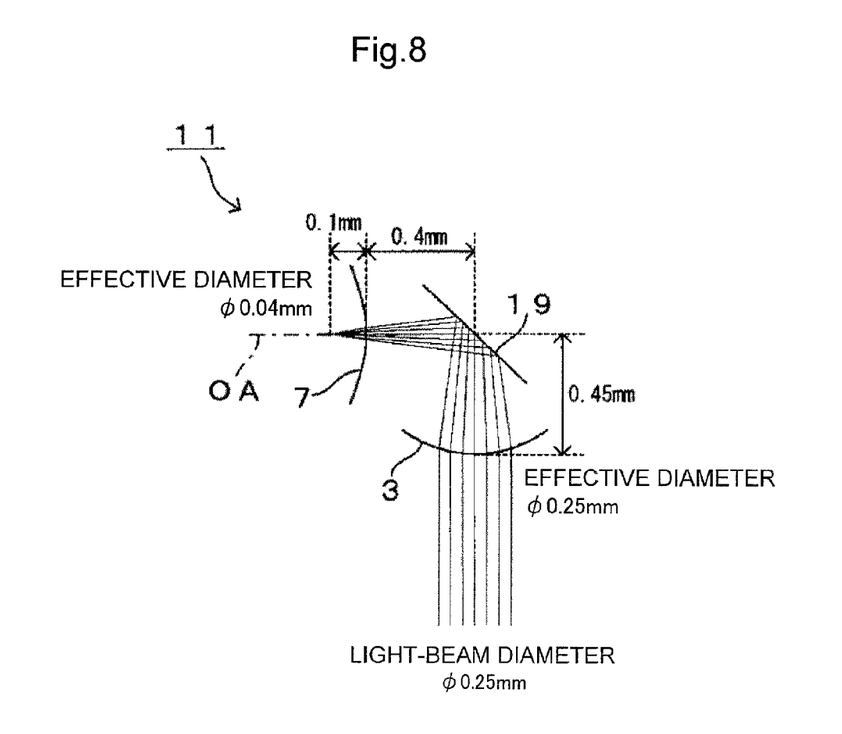
FIG. 8 This is a schematic diagram of an example of an optical path actualized by the lens array in FIG. 7.

For example, as shown in FIG. 8, with the concave-shaped lens faces (non-spherical) 7 as the incident side of light and the convex-shaped lens faces (non-spherical) 3 as the outgoing side of light, the lens array of the present example such as this can be used to obtain collimated light having a diameter of Φ0.25 mm on the outgoing side. Specifically, the collimated light having a light-beam diameter such as this can be actualized by a position 0.1 mm from the concave-shaped lens face 7 on the optical axis OA being set as the outgoing position of light towards the lens face 7, the effective diameter of the concave-shaped lens face 7 being set to Φ0.04 mm, the effective diameter of the convex-shaped lens face 3 being set to Φ0.25 mm, and the optical path length of center light within the lens array 11 being set to 0.85 mm.

Figure 9:
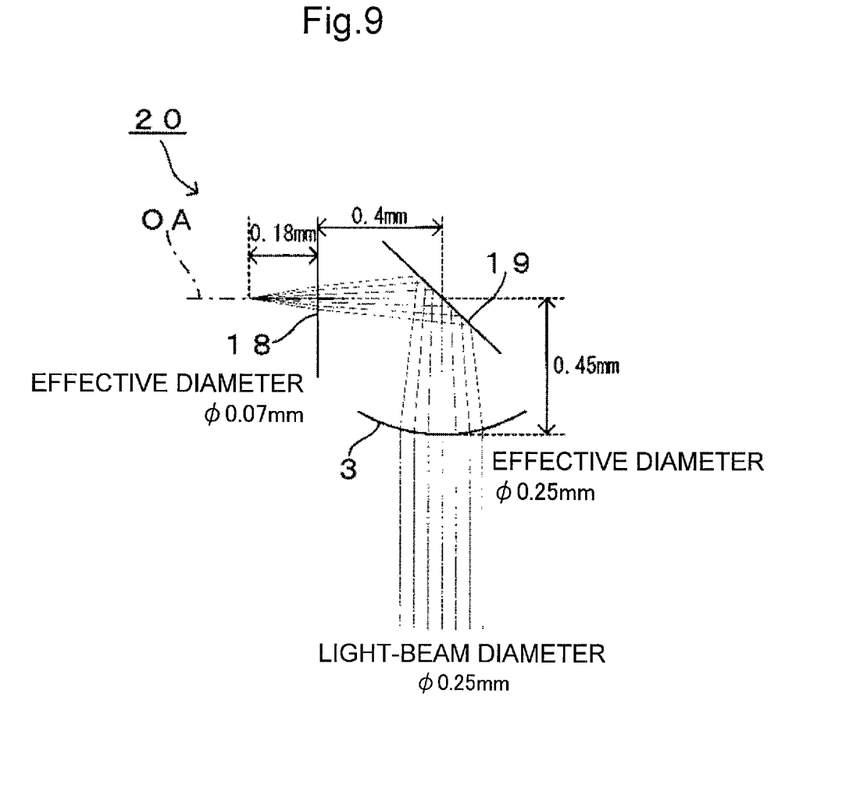
FIG. 9 This is a schematic diagram of a comparison example of the second example.

On the other hand, as shown in FIG. 9, in an instance in which collimated light having the same light-beam diameter as that of the lens array 11 in FIG. 5 is to be obtained by a plano-convex lens array 20, a position 0.18 mm from the plane lens face 18 on the incident side on the optical axis is required to be set as the outgoing position of light towards the lens face 18.

Therefore, in the present example as well, use of the concave lens faces 7 is advantageous for shortening the optical path length in the device when collimated light of a desired light-beam diameter is to be obtained.

The present invention is not limited to the above-described embodiment. Various modifications can be made without compromising the features of the present invention. For example, specific numerical values described in the examples are merely examples. Various other suitable numerical values based on concepts may, of course, be selected.

The invention claimed is:

1. A lens array formed using a mold, the lens array comprising:
    a plurality of lens faces formed in an array along a predetermined array direction on a predetermined surface of a lens array main body, in which the plurality of lens faces are concave-shaped lens faces that recess inward from the predetermined surface such that face apex portions of the lens faces are farther away from the predetermined surface than are outer peripheral edge portions of the lens faces, wherein
    the outer peripheral edge portions of the plurality of lens faces are formed in positions closer toward the face apex portion side than toward the predetermined surface with cylindrical recessed surfaces for the respective lens faces therebetween, the recessed surfaces rising from the outer peripheral edge portions as one end, to a plurality of opening portions, as another end, formed on the predetermined surface corresponding to the respective outer peripheral edge portions.

2. The lens array according to claim 1, wherein:
    the outer peripheral edge portions of the plurality of lens faces are formed in positions shifted toward the face apex portion side from the predetermined surface by a same distance as one another.

3. The lens array according to claim 1, wherein:
    a rounded shape reflecting the shape of a tip end portion of a cutter used for machining the mold is formed in the opening portion of the recessed surface for each lens face.

4. The lens array according to claim 2, wherein:
    a rounded shape reflecting the shape of a tip end portion of a cutter used for machining the mold is formed in the opening portion of the recessed surface for each lens face.

* * * * *